United States Patent [19]

Ogura et al.

[11] Patent Number: 5,084,216
[45] Date of Patent: Jan. 28, 1992

[54] APPARATUS FOR PRODUCING HIGHLY HUMID AIR

[75] Inventors: Takashi Ogura; Yoshihiro Ogura, both of Chiba, Japan

[73] Assignee: Nihon Vaporizer Co., Ltd., Chiba, Japan

[21] Appl. No.: 638,538

[22] Filed: Jan. 8, 1991

[30] Foreign Application Priority Data

Feb. 2, 1990 [JP] Japan .................. 2-24048

[51] Int. Cl.$^5$ .................................. F02M 25/02
[52] U.S. Cl. .................... 261/18.2; 123/25 A; 123/25 L
[58] Field of Search .................. 261/18.2; 123/25 A, 123/25 L

[56] References Cited

U.S. PATENT DOCUMENTS

| 1,280,455 | 10/1918 | Hand | 261/18.2 |
| 3,236,214 | 2/1966 | Johnson | 261/18.2 |
| 3,856,901 | 12/1974 | Neumann et al. | 261/18.2 |
| 4,391,229 | 7/1983 | Turner | 123/25 L |
| 4,411,224 | 10/1983 | Goodman | 123/25 A |
| 4,479,907 | 10/1984 | Ogura | 261/18.2 |

FOREIGN PATENT DOCUMENTS

52-28179 7/1977 Japan .

*Primary Examiner*—Tim Miles
*Attorney, Agent, or Firm*—Wenderoth, Lind & Ponack

[57] ABSTRACT

An apparatus provides improvement over the apparatus that provides a highly humid air into a boiler or internal combustion engine such as diesel, gasoline, and other similar engines, and improves the fuel economy and reduces the amount of the produced exhaust gases from the boiler, etc. by adding the highly humid air into the suction pipe through which it is delivered into the combustion chamber together with the mixture of the injected fuel gas and air. The highly humid air provided by the improved apparatus contains a mixture of vaporized water flow drawn by suction under the reduced pressure developed within the combustion chamber and an air flow drawn from the atmosphere, the mixture being formed by allowing the two flows to meet together and strike against each other at angles of 55 to 65 degrees.

9 Claims, 5 Drawing Sheets

APPARATUS FOR PRODUCING HIGHLY HUMID AIR

BACKGROUND OF THE INVENTION

1. Field of Invention

The present invention provides improvement on and to the highly humid air producing apparatus, which is designed to improve the fuel economy for boilers or automotive vehicles' internal combustion engines such as gasoline engines, diesel engines, and the like, and to minimize or substantially reduce the amounts of the produced harmful exhaust gases from those boilers or engines which may contain $NO_x$, CO, hydrocarbon, black smokes, and/or the like.

2. Description of the Prior Art

There is a prior similar apparatus that provides for improving the fuel economy for the boilers or the internal combustion engines like gasoline-powered or diesel-powered engines, and for reducing the amounts of the harmful exhaust gases that may contain $NO_x$, CO, hydrocarbon, and/or black smokes, wherein those objectives may be achieved by producing the "highly humid air" to be delivered into the suction pipe (through which a fuel-and-air mixture is also delivered into the internal combustion chamber).

Although the "highly humid air" may be obtained in some or other ways, there are very few apparatuses and/or methods that are capable of providing the "highly humid air" which is effective enough to satisfy the practical requirements. One of the inventors of the current application, named Takashi Ogura, filed the prior patent application for his own invention in the United States of America and Japan. That prior application disclosed the apparatus that was capable of providing such effective "highly humid air".

The U.S. application was patented as Pat. No. 4,479,907 on Oct. 30, 1984, and the corresponding Japanese application No. 57-143865 as filed on Aug. 19, 1982 is still examined and is now published as No. 59-34470 on Feb. 24, 1984. Both applications disclose the identical invention on which the invention in the current application as now filed is based.

To help understand the fundamental concept of that prior basic invention, some essential components of the apparatus as disclosed in the above-mentioned prior Japanese application are listed and described briefly. The apparatus includes a container that holds water, a narrow water vaporizer pipe 4 having a narrow water inlet located in the water in the container (which corresponds to the first narrow pipe 1 as referred to hereinafter in the current specification) which draws water from the water inlet by suction under reduced pressure and produces vaporized water, a narrow air pipe 14 (which corresponds to the second narrow pipe 2 as referred to hereinafter in the current specification) having an air inlet which admits air in the atmosphere, a three-way meeting point 5 (which corresponds to the meeting point 5 as referred to hereinafter in the current specification) including two inlet branches and one outlet branch extending therefrom like the reversed Y shape, where the vaporized water flow from the vaporizer pipe 4 and the air flow from the air pipe 14 through the respective inlet branches meet together, going upwardly through the outlet branch, and a narrow suction pipe (which corresponds to the third narrow pipe 3 as referred to hereinafter in the current specification) which forces the mixture of the vaporized water and air flows to rise and go out of the suction pipe through its outlet nozzle.

One of the important features of the basic invention is the provision of the very narrow suction nozzle 3 (which corresponds to the water inlet as referred to hereinafter in the current specification) on the water vaporizer pipe. It has the bore diameter of as small as 0.3 mm, so that when a reduced pressure of 200 to 700 mmHg., which is developed within the running engine room, is introduced into the water vaporizer pipe, it can draw water from the container through its suction nozzle 3. Thus, the vaporized water can be produced readily.

The second feature is the particular angle at which the vaporized water from the vaporized pipe and the air flow from the air pipe are to meet together and strike against each other at the three-way meeting point. According to the basic invention, the angle, which corresponds to the angle $\alpha$ as referred to hereinafter in the current specification, is specified as an acute angle. Otherwise, after the two flows meet together into a single flow, its rate would become slower, which would cause a non-uniform mixture, or would prevent relatively large water lumps or clusters from being vaporized into smaller lumps or particles. This would cancel the effect of the basic invention on the improved fuel economy and the reduction in the amount of the produced harmful exhaust gases.

The third feature is that there is no excessive space at the three-way point, which would otherwise cause a further reduction in the pressure and flow rate. This feature allows the two flows to meet together and strike against each other at the three-way meeting point, with their respective sustained speeds, so that the relatively large water lumps or clusters can be dissolved into smaller lumps or particles. In this way, the objectives of the basic invention can be attained.

In this respect, there is another prior-art disclosure that is provided in the Japanese patent publication No. 52-28179, as cited by the Examiner in Japan during the prosecution of the basic invention now being discussed. The publication discloses an alternative, but quite different, meeting point shown in FIG. 3 therein, which provides an excessive space in which a differential pressure chamber 18 is located. This construction would adversely affect both the vaporized water flow from the vaporizer pipe and the air flow from the air pipe, in such a manner that the two flows would have the further reduced pressure and speed, respectively, at the meeting point. As a result, the vaporized water flow would receive the weaker striking force from the air flow. This would affect the effects of improving the fuel economy and of reducing the produced harmful exhaust gases.

The fourth feature is that the narrow suction pipe is disposed substantially vertically. In the construction as disclosed in the above Japanese patent publication No. 52-28179, however, the narrow bore 7, which corresponds to the narrow suction pipe, is so inclined that it is directed downwardly from its horizontal position. The result is that the mixture of the air and vaporized water flows formed at the meeting point would be separated into the water flow that travels along the inside wall by its own weight, and the air flow that contains no or little vaporized water. This would also affect the effects of improving the fuel economy and of reducing the produced harmful exhaust gases.

SUMMARY OF THE INVENTION

In the specification in which the basic invention is disclosed, the angle (the angle α) at which the two flows meet together at the meeting point has a particular value, which is equal to ten (10) degrees. The inventors of the current application have made further studies to find any possible improvement over the basic invention, and have then discovered that the basic invention remains yet to be improved further with regard to the improved fuel economy and reduced harmful gas production; that is, that particular angle value is not adequate for those purposes.

The inventors have continued to study this problem, and have then found that the angles α of between 55 and 65 degrees can solve the problem. They have been successful in implementing the present invention.

It is accordingly a principal object of the present invention to provide a highly humid air producing apparatus including a water holding container 4, a first narrow pipe 1 having a water inlet located in the water in the container and for producing vaporized water by drawing water from the container through its water inlet by suction under reduced pressures, a second narrow pipe 2 having an air inlet with its port communicating with the atmosphere, a three-way meeting point 5 including two inlet branches and one outlet branch formed like the reversed Y-shape where the vaporized water flow from the first narrow pipe 2 and the air flow from the second narrow pipe 2 through the respective inlet branches meet together and strike against each other, forming a single flow, and this flow is then forced to rise through the outlet branch, and a third narrow pipe 3 disposed substantially vertically and having its outlet nozzle through which the single flow rising from the outlet branch and then through the pipe 3 is forced out, wherein the improvement comprises the provision of the reversed Y-shape three-way meeting point including the two inlet branches that meet together at the particular angles α of between 55 and 65 degrees.

Why and how the angles α=55 to 65 provide the remarkably high efficiency as compared with the basic invention cannot be accounted for theoretically, but this fact has been proved empirically, which will be explained later.

The term "highly humid air" as referred to herein in connection with the description of the apparatus that provides the "highly humid air" refers to the unstably bonded water molecules in vapor state which contribute to less bonding ability between the hydrogen atoms and oxygen atoms in the water molecules. Dissolving the ordinary water molecules thermally requires the high temperatures above 2000° C., whereas the highly humid air, which contains the unstably bonded water molecules, can be dissolved thermically with the amount of thermal energy that is equal to one-third the usual thermal energy requirements, that is, at the temperatures of 700° C. to 800° C. It may be understood that the highly humid air has the property that contributes greatly toward improving the fuel economy and reducing the produced harmful exhaust gases.

The highly humid air that is created by the apparatus of the present invention may be delivered into boilers or internal combustion engines such as gasoline engine and diesel engine. The following information is provided to describe the mechanism or process in which the burning occurs in each of those cases when the highly humid air is delivered.

(1) Boilers

When a highly humid air is produced, its flow is drawn by the air flow that is drawn from the atmosphere for use in burning and then introduced into the oil injector through the inlet in the same position as the burner's nozzle, where the highly humid air flow and the air flow from the atmosphere are mixed with the injected oil. The highly humid air is capable of being dissolved thermally at temperatures of 700° C. to 800° C., and so the highly humid air flow that has been drawn by the air flow from the atmosphere will receive the amount of thermal energy that is required to permit it to dissolve before it reaches the flame layer in the boiler, where it dissolves into hydrogen and oxygen. Immediately following the dissolution, the hydrogen burns by producing a high-temperature, high calorie, and has its thermal effect upon the particles in the oil around it. In the meantime, the oxygen causes a chain oxidization reaction with other combustible elements one after another.

During the usual burning process that occurs in the burner, exhaust gases with accompanying thermal loss are produced. The air flow drawn from the atmosphere into the burning chamber for the burning promotion contains 79% of nitrogen and 21% of oxygen, which means that the air flow contains the volume of nitrogen that is substantially equal to four times that of oxygen required for burning. The large quantity of nitrogen contained in the air flow drawn into the burning chamber will absorb the heat produced within the burning chamber, increasing its volume. With the increasing volume, the nitrogen flows with more speed toward the chimney way, absorbing more heat within the furnace and finally going out of the furnace. During this process, the temperature prevailing along the internal furnace wall is falling, and other combustible elements that are floating within the burning chamber are also led toward the chimney way and go out of the furnace, without completing their reaction with the oxygen. The flow rate of the flame is also increasing, and the amount of heat that is conveyed from the flame to the heat conducting surface is decreased accordingly, causing the lower thermal efficiency. The nitrogen component that accounts for about 4/5 of the air flow drawn in large quantities from the atmosphere into the burning chamber produces large quantities of $NO_x$ gases.

According to the present invention, the highly humid air flow from the apparatus is delivered into the boiler. In this case, the highly humid air flow is dissolved thermally as described earlier, and the oxygen component contributes to the burning within the burner. Thus, the amount of oxygen in the air flow drawn from the atmosphere for burning need not be large, and therefore, the amount of air flow from the atmosphere can be reduced. The experiments demonstrate that the amount of air flow drawn from the atmosphere into the boiler can be reduced by 30%, as compared with the usual boilers where the burning occurs without the highly humid air. The considerable reduction can thus be achieved in the thermal loss and $NO_x$ gases that have been caused by the large quantities of air flow drawn from the atmosphere into the burning chamber and by the large volume of nitrogen that is substantially equal to 4/5 of the total volume of the air flow when the burning occurs within the usual burners.

(2) Internal Combustion Engines

When a highly humid air is created, its flow is drawn through an intake manifold into the air flow drawn from the atmosphere and then into the internal combustion chamber. The highly humid air contains gaseous components and undissolved water drop components. The undissolved water drop components turns into latent heat, upon being exposed to the high-temperature heating within the internal combustion chamber, and this latent heat is conducted to the air flow drawn from the atmosphere, creating the favorable thermal environment within the internal combustion chamber where heat can be evenly distributed. Also, it has the thermal effect upon the particles contained in the injected fuel, helping promote the chemical reaction and create the burning area. In the meantime, the gaseous components are ignited, producing the thermal dissolving reaction readily (at the temperatures of 700° C. to 800° C.). This allows those components to dissolve into oxygen and hydrogen. The hydrogen component is powerfully explosive, and may also serve as fuel in addition to those other fuels injected into the internal combustion chamber.

As demonstrated by the experiments, it is possible to save the amount of fuel injected into the internal combustion chamber by 10%, by delivering the highly humid air, and yet to provide the equivalent power output. The hydrogen component that burns explosively produces the high-temperature, high calorie output that helps the particles in the fuel burn well. The oxygen component bonds with the particles in the fuel, which also helps those particles burn well. Thus, the required amount of oxygen contained in the air flow from the atmosphere that is used for burning the fuel can be reduced, and the required total amount of air flow from the atmosphere that contains about 80% nitrogen and which must be drawn into the combustion chamber can be reduced correspondingly. For the usual internal combustion engines where no highly humid air is delivered, the amount of air that is sufficient to help produce the explosive power must be drawn from the atmosphere into the combustion chamber. As already described, such amount of air contains about 80% nitrogen which produces large quantities of $NO_x$ as exhaust gases. For the engines where the highly humid air is delivered, the highly humid air contains the gaseous components which can reduce the amount of air from the atmosphere by the amount equal to their volume occupying the highly humid air. Thus, the quantity of nitrogen can be reduced correspondingly, and the production of $NO_x$ can be decreased. In this case, the quantity of oxygen available in the air flow from the atmosphere decreases with the decreased amount of the air flow, but it can be complemented by the supply of the oxygen component that can be obtained when the highly humid air is dissolved thermally.

In this way, the burning efficiency is increased with the improved fuel economy, while the reduction in the produced exhaust gases such as $NO_x$ can be achieved.

The apparatus that produces the highly humid air as described so far is now described briefly. It includes a first narrow conduit or pipe 1 which preferably has the length of about 10 mm to 50 mm, and the internal diameter of about 1 mm to 5 mm, having a water inlet preferably having the diameter $d_0$ of about 0.1 mm to 0.5 mm. The larger diameter $d_0$ of the water inlet makes the production of $NO_x$ the smaller. For any large-scale diesel engines, the water inlet may have the maximum diameter of as many as 1.5 mm.

The inventors have obtained the following results by the experiments in which first narrow pipe 1 and outlet nozzle assembly 9e are provided for the testing processes, respectively. The first narrow pipe 1 includes a water inlet assembly 7 having a central passage of $d_0$ as diameter size, and the outlet nozzle assembly 9e has a central passage of $d_2$ as diameter size. The following results have been obtained by the experiments with the combination of $d_0=d_2$. With referring to the density of HC gass contained in the produced exhaust gases, the combination of $d_0=d_2$ ranging between 0.1 mm and 0.5 mm provides less HC. With referring to the density of $NO_x$ gas contained in the produced exhaust gases, the greater $d_0=d_2$ values provide the less $NO_x$, and $d_0=d_2$ values may have the maximum possible value of 1.5 mm for reducing $NO_x$ density. When the experiment was tested with different $d_0=d_2$ values from 0.05 mm. The density of HC becomes smaller when $d_0=d_2$ value becomes greater up to 0.5 mm. As mentioned before, less HC density can be obtained by the combination of $d_0=d_2$ ranging between 0.1 mm and 0.5 mm. The HC density becomes greater as $d_0=d_2$ value becomes greater from the value of 0.5 mm. However, in case the apparatus of the present invention having $d_0=d_2$ size not more than 1.5 mm is used, HC density remains less than the HC density which is measured by the experiments with no apparatus is used. Therefore, maximum possible value of $d_0=d_2=1.5$ mm may be adopted for obtaining the least possible $NO_x$ density with HC density remains less than the case which the present apparatus is not used.

The apparatus includes three-way meeting point 5 contains three branches internall, formed like the reversed Y-shape. Each branch in the three-way meeting point 5 may preferably have the diameter of 1 mm to 3 mm.

The apparatus also includes a second narrow conduit or pipe 2 that may have any length depending upon the requirements, and may preferably have the diameter of about 1 mm to 5 mm.

A third narrow conduit or pipe 3 is connected to a three-way meeting point where a vaporized water flow through the first narrow pipe 1 and an air flow through the second narrow pipe 2 meet together, and provides a more uniform mixture of those two flows, causing it to rise through the third narrow pipe 3.

The third narrow pipe 3 should preferably be disposed substantially vertically, but may be inclined at angle range of between +19 degrees and −19 degrees with regard to the vertical line. In some cases, it may be inclined at angle range of between not more than +20 degrees and not more than −20 degrees. If the pipe 3 is inclined at any greater angles, the mixture of the flows, or the air flow containing the vaporized water, through the third pipe 3 may contain relatively large water lumps (or clusters) which tend to contact the inner pipe wall, resulting in forming larger water clusters. Finally, those clusters may turn back into a water flow, falling down along the inner pipe wall. More specifically, the air flow containing the vaporized water is separated into two flows, one containing water falling down along the inner pipe wall and the other being the air flow containing no water. This may have the adverse effect upon improving the fuel economy and reducing the produced exhaust gages. This adverse effect has been demonstrated by the experiments.

The third narrow pipe 3 preferably has the length of about 80 mm to 180 mm, and the internal diameter of about 1 mm to 5 mm.

Using the before mentioned diameter sizes of the each branch in the three-way meeting point 5 ranging between 1 mm and 3 mm and the first narrow pipe 1, second narrow pipe 2 and third narrow pipe 3 ranging between 1 mm and 5 mm provide the particular advantage for the following reason. These diameter sizes are preferable for preventing the branches in the three-way meeting and pipes from the inconvenience which may be caused when silica or calcium etc. contained in the water is accumulated as a slag on the inner surface of said branches and pipes. If the slag is accumulated the pressure of highly humid air becomes instability, or the injected fuel can not burn nearly completely within the internal combustion engine or boiler into which the highly humid air is delivered, such as any inconvenience may be caused. Therefore, the apparatus cannot be used for long period such as enough over fifteen years.

The present inventors have discovered, after many years experiments, the before mentioned diameter sizes by which the apparatus can be used for long periods such as over fifteen years with usual maintenance, and the better burning condition is obtained.

At the three-way meeting point, the first and second narrow pipes 1 and 2 should preferably meet together at angles $\alpha$ of between 55 and 65 degrees. In this way, when the highly humid air flow formed in the apparatus is delivered into the internal combustion engine or boiler, it helps the injected fuel burn nearly completely within the respective combustion chamber, followed by raising the temperature at the flame core. This contributes to the reduction in the densities or concentrated contents of CO, HC, and $NO_x$ in the exhaust gases, respectively. The fuel economy is also improved.

BRIEF DESCRIPTION OF THE DRAWINGS

Those and other objects, features, and merits of the present invention will become more apparent from the following detailed description of several preferred embodiments of the invention, which are shown in the accompanying drawings, in which.

DESCRIPTION OF THE PREFERRED EMBODIMENTS

The following description is provided for a specific form of the apparatus according to the present invention. It should be understood that the specific form of the preferred embodiment to be described below may be varied in any way or manner, without departing from the spirit and scope of the invention as claimed in the appended claims.

Figure 1:
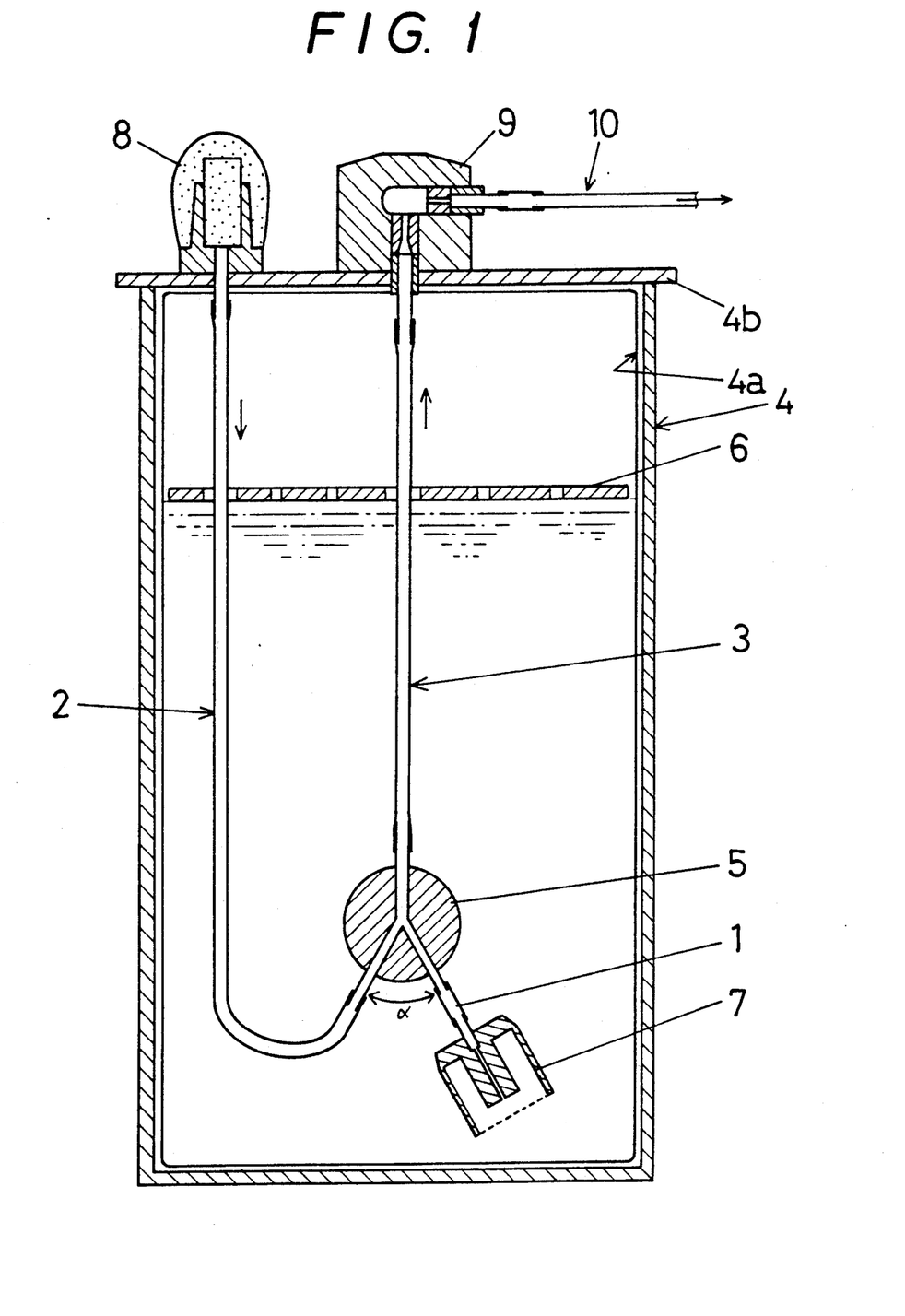
FIG. 1 is a schematic vertical section view showing the construction of the typical preferred embodiment of the apparatus according to the present invention.

Referring first to FIG. 1, there is the typical construction of the apparatus according to the present invention, which is capable of producing a highly humid air and which is schematically shown as vertical section view.

The principal components of the apparatus are contained in a cylindrical stainless housing 4 forming an integral part of the apparatus body, and having the inner diameter of 100 mm and the height of 200 mm, for example, backed by a thin polyethylene film 4a of similar cylindrical shape (inner sleeve) which is mounted inside the housing 4. The thin inner sleeve 4a serves as means of (1) isolating the interior from the ambient temperature outside it and preventing a water flow from being frozen, and (2) facilitating the cleaning of the interior of the housing 4 when it is mounted to any external equipment. The inner sleeve 4a has a single longitudinal groove (like a V-shape as viewed from above). This groove allows the air inside to escape to the outside when the inner sleeve 4a is being mounted, thus making its mounting easier.

The housing 4 also contains water. When the water level is high, it may fluctuate when it is subjected to any vibrating forces. A floating lid 6 is provided over the water level, in order to control such fluctuations. This floating lid 6 also prevents the water inlet 7 on the first narrow pipe 1 from being raised above the water level when it is lowered down to the location of the water inlet 7. The floating lid 6 is preferably made of hard polyvinyl chloride formed like a round shape (2 mm thick), carrying a plurality of apertures extending through it.

The top of the housing 4, which is open, has a stainless top cover 4b which is removably mounted on it by means of one-touch ring (not shown). A rubber packing (not shown) is provided on either of the top of the housing 4 or the top cover, or both, to ensure the water-tightness between those two parts. When the top cover 4b is mounted, it keeps the housing 4 water-tight. Thus, no water leaks would occur if the housing 4 should be inclined.

The first narrow pipe 1 may be made of any suitable transparent vinyl materials that have the thermal and pressure resistant properties, and may preferably have the internal diameter of 2.7 mm and the length of 30 mm. This pipe 1 draws water in the housing 4, and provides a water vaporization. It has the water inlet 7 at the bottom end thereof, which is open to admit the water. At its top end, it is connected to the three-way meeting point 5.

Figure 2:
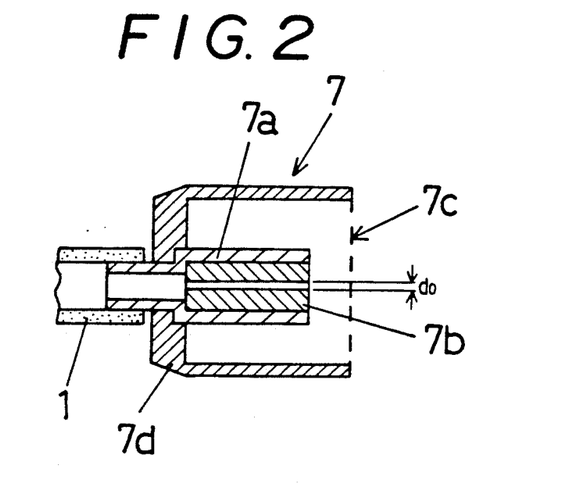
FIG. 2 is a schematic vertical section view showing a water inlet 7.

As shown in FIG. 2, the water inlet assembly 7 includes a phosphorbronze outer nozzle casing 7a which is mounted to the first narrow pipe 1, an inner nozzle 7b mounted inside the outer nozzle casing 7a and having the length of 10 mm, the external diameter of 8.5 mm and the internal diameter $d_0$ of 0.3 mm, a stainless meshed filter 7c for preventing any dusts entering the nozzle on its entry side, and an outermost cylindrical plastics casing 7d for mounting the filter 7c to the outer nozzle casing 7a.

The inner nozzle 7b may be made of any high-polymer polyethylene materials that are specifically designed to prevent any silica contained in the water from settling. It defines a narrow water passage of 0.3 mm in diameter $d_0$, extending longitudinally through it.

When the boiler or engine is running, it produces a negative pressure or near to vacuum which places the interior of the first narrow pipe 1 under the reduced pressures (which are equal to 200 to 700 mm Hg.). Under the reduced pressures, water is drawn by suction into the nozzle and then into the first narrow pipe 1, where the water is readily vaporized into vapors.

The second narrow pipe 2 admits air from the atmosphere, and may have the J-shape as shown in FIG. 1. This may also be made of any suitable vinyl materials that have the thermal and pressure resistance propreties, and may have the internal diameter of 2.7 mm and the length of 160 mm. At its top end, it has an air inlet 8 which opens to admit air from the atmosphere, and at its bottom end, it is connected to the three-way meeting point 5.

Figure 3:
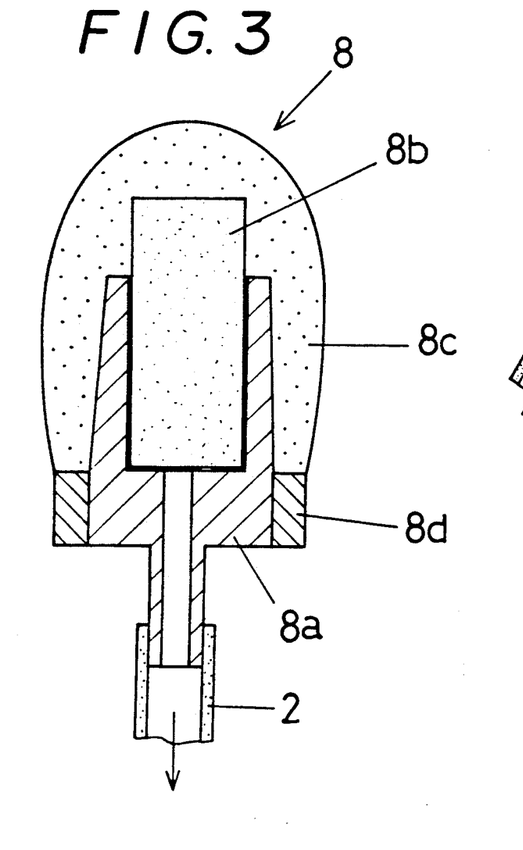
FIG. 3 is a schematic vertical section view showing an air inlet 8.

The air inlet assembly 8 is mounted to the top cover 4b, and as particularly shown in FIG. 3, it includes a bronze nozzle 8a communicably connected to the second narrow pipe 2, a subassembly consisting of an air control filter 8b mounted inside the nozzle 8a and having the length of 10 mm and the external diameter 8.5 mm, and a plastics dust-filter 8c (such as the one offered by Kurita Kogyo Co., Japan, as the tradename "Clippet") enclosing the air control filter 8b, and a mount casing 8d for the filter 8c.

The air control filter 8b may be made of any suitable porous plastics materials that are foamed continuously (which form a curved passage with successive cavities). This filter 8b provides the function of controlling the "water-to-air ratio" in the produced highly humid air, which will be described later in the Example 4. No filters of any other types provide this function.

Figure 4:
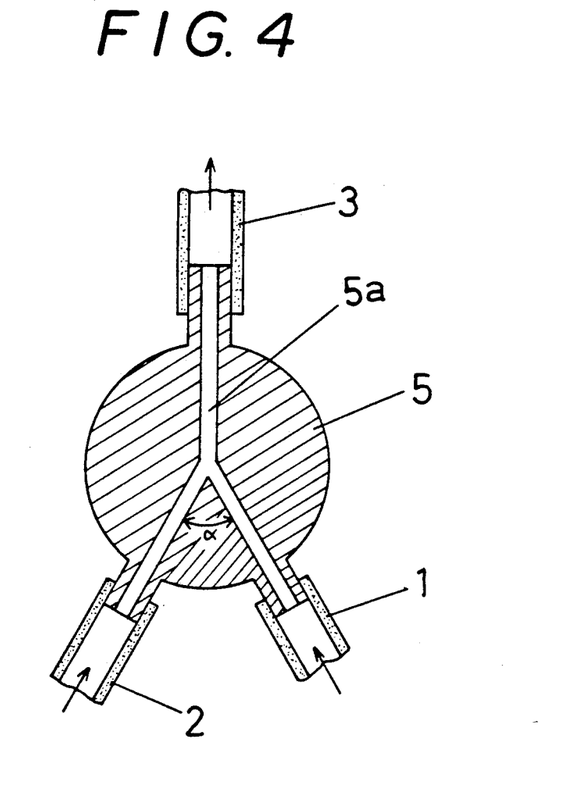
FIG. 4 is a schematic vertical section view showing a three-way meeting point.

The three-way meeting point 5 allows the vaporized water flow from the first narrow pipe 1 and the air flow from the second narrow pipe 2 to meet together and strike against each other, and then causes the resulting flow to rise upwardly (toward the third narrow pipe 3). It has the external round shape which is 8 mm thick and 20 mm in diameter.

The meeting point 5 may be made of high-polymer polyethylene. Using this material provides the particular advantage for the following several reasons. The meeting point 5 contains three branches internally, formed like the reversed Y-shape (each branch having the internal passage diameter of 2 mm). At the wedge-formed point where the vaporized water flow from the first narrow pipe 1 into the corresponding branch and the air flow from the second narrow pipe 2 into the corresponding branch meet together and strike against each other, the material becomes more easily worn. When this material is used, it will not become worn so easily. Using this material also prevent any silica in the water from settling. If wear should occur at that point, making it round, no highly humid air could be produced any longer, affecting the possible fuel economy and harmful exhaust gas reduction.

Each branch in the three-way meeting point 5 should not have the excessively large internal diameter, but should preferably have the diameter of 1 mm to 3 mm.

The three-way meeting point assembly 5 includes three connector pipes extending therefrom, each of which can be connected with each corresponding one of the first, second, and third narrow pipes by fitting it thereinto, thereby establishing the interconnecting relationship between the three-way meeting point 5 and each narrow pipe.

The angle $\alpha$ between the first and second narrow pipes 1 and 2 has a specific value of 60 degrees in this example. It is important that the spacing between the outlet of the first narrow pipe and the outlet of the second narrow pipe should not be wide, but the two outlets should be adjacent to each. Suppose that there is a wide spacing between the two outlets. Then, there would be an excessive space that would cause the reduction in pressure (flow rate) at the meeting point.

The air flow which exits from the meeting point 5 up into the third narrow pipe 3, or the air flow containing the vaporized water, appears to be obscurely white when it is viewed by human eyes. As it is rising through the third narrow pipe 3, the air flow is gradually becoming less white and more transparent. At the top end of the third narrow pipe 3, there are relatively water drops that may be seen by human eyes.

The process during which the air flow is progressively changing from its obsure white color to the relatively large water drops is important, and the function of the third narrow pipe is to produce this change.

The third narrow pipe 3 may preferably have the length between 80 mm and 180 mm. If the third narrow pipe 3 has the length out of said range the before mentioned change of the air flow from its obscure white color to the relatively large water lumps or cluster cannot be caused.

The third narrow pipe 3 is now described. It may be made of any suitable transparent vinyl materials that have the thermal and pressure resistance properties, and is a vertical, straight pipe having the internal diameter of 2.7 mm and the length of 160 mm. At its top end, the third narrow pipe 3 leads to its outlet 9 which extends outwardly through the outer casing 4 and through which the highly humid air flow is delivered. At its bottom end, the third narrow pipe 3 is connected to the meeting point 5.

Figure 5:
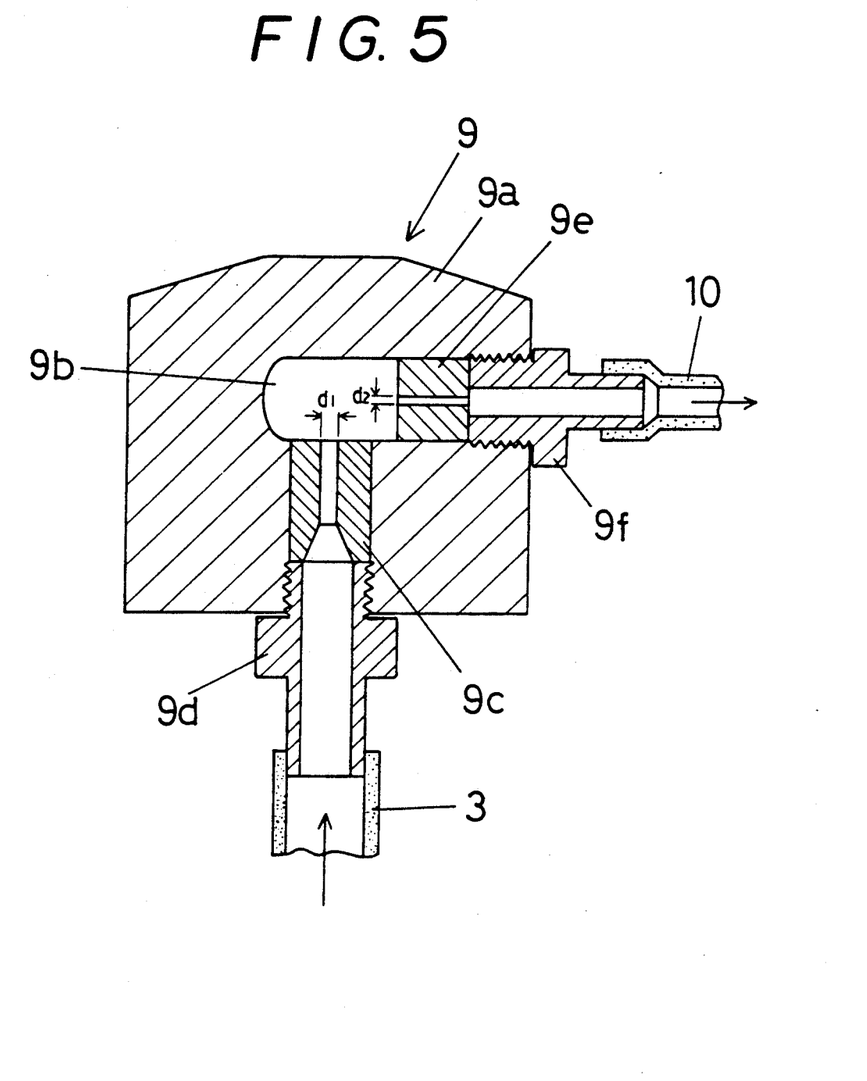
FIG. 5 is a schematic vertical section view showing a highly humid air flow outlet 9.

More speicifically, the outlet assembly 9 is mounted to the top cover 4b, and as particularly shown, includes an outer casing 9a made of phosphor bronze or bronze, a chamber 9b located within the outer casing 9a and which is placed under a constant negative pressure or near to vacuum, the chamber 9b having the cylindrical shape disposed in its horizontal position and having the diameter of 8 mm and the length of 10 mm, a vertical pre-stage nozzle 9c disposed in the intermediate inlet region between its inlet side and the chamber 9b communicatively with the chamber 9b and having the height of 6 mm and the external diameter 2.7 mm, a connector 9d mounted to the inlet side of the intermediate inlet region by screwing or other means, a horizontal outlet nozzle 9e extending outwardly from the chamber 9b and disposed within the intermediate outlet region between the chamber 9b and its outlet side communicatively with the atmosphere, the horizontal outlet nozzle 9e having the length of 8 mm and the external diameter of 8 mm, and a connector 9f mounted to the outlet side of the intermediate outlet region by screwing or other means.

At its bottom end, the connector 9d is connected to the third narrow pipe 3. The connector 9d has a central passage extending longitudinally therethrough, having the diameter of 2.7 mm. Through this central passage, the air flow containing the vaporized water is rising, and goes further through the vertical pre-stage nozzle 9c, entering the chamber 9b.

The vertical pre-stage nozzle 9c may be made of any suitable high-polymer polyethylene, and has a central passage extending longitudinally therethrough, having the diameter $d_1$ of 0.8 mm.

The chamber 9b and the vertical pre-stage nozzle 9c are provided for the following reason. In the recipro engine, a negative pressure (reduced pressure or nearly vacuum) is developed during the suction stroke, and provides the priming power that draws water into the first narrow pipe 1 by suction. This priming power also draws air from the atmosphere into the second narrow pipe 2. During the period in which the engine is cycling from one suction stroke to the next suction stroke, no or little negative pressure is developed. During this period, the negative pressure is pulsating. No suction occurs if no negative pressure condition exists. Under the non-negative pressure condition, the air flow containing the vaporized water which is then rising through the third narrow pipe 3 is left falling down therethrough. When it is falling down, the air flow containing the vaporized water is separated into the water falling down along the internal pipe wall and the air that contains little or no water. When the chamber 9b and pre-stage nozzle 9c are present, however, they retain the negative pressure developed during the preceding suction stroke, until the suction stroke during the next cycle begins. This negative pressure continues to act upon the third narrow pipe 3, under which the air flow containing the vaporized water can continue to be rising without falling down.

For the boiler or diesel engine where no negative pressure is developed or the negative pressure is small, an additional diaphragm-type electric suction pump is provided. This pump may be interposed between the boiler or diesel engine and the apparatus of the invention, and its connection may be made by an interconnecting hose between the boiler and engine. In this application, the negative pressure is pulsating but will never reach zero (0), so the chamber 9b may be eliminated.

The air flow containing the vaporized water goes from the chamber 9b into the final-stage outlet nozzle 9e, from which it goes out of the apparatus. Through the process described above, a highly humid air is finally obtained.

The outlet nozzle 9e may be made of any suitable high-polymer polyethylene, and has a central passage extending horizontally therethrough, the passage having the diameter $d_2$ of 0.3 mm. The central passage should preferably have the diameter value $d_2$ of 0.1 mm to 0.5 mm, and the greater value within the diameter value range will help reduce the amount of the produced $NO_x$ gases the more effectively. For some particular applications where the apparatus of the invention is used for the large-scale diesel engine, the central passage through the outlet nozzle may have the maximum possible diameter $d_2$ value of 1.5 mm. The value $d_2$ should preferably be equal to the value $d_o$ for the central passage through the nozzle 7b on the water inlet 7.

During the period in which there is no or zero negative pressure, the outlet nozzle 9e interacts with the air control filter 8b, placing the third narrow pipe 3 internally under its nearly sealed condition, and thereby preventing the flow rising through the pipe 3 from falling down. The outlet nozzle 9e may also provide effective means of creating the highly humid air.

The connector 9f on the outlet side of the nozzle 9e has a central passage extending horizontally therethrough, the passage having the diameter of 2.7 mm.

On its outlet side, the connector 9f is coupled with the interconnecting hose 10 which leads to the appropriate engine or boiler.

The interconnecting hose 10 may be made of any suitable transparent vinyl materials that have the thermal and pressure resistance properties. It may have the internal diameter of 2.7 mm.

At its other end, the interconnecting hose 10 may be connected to the appropriate engine directly or through the suction pump. This connection also provides for the passage through which the pulsating negative pressure may be delivered from the engine or suction pump and through the outlet nozzle 9e into the apparatus.

The observer can have the opportunity to examine through the transparent interconnecting hose 10 so as to see how the highly humid air formed in the manner as described so far is flowing through the hose 10. In one of the various experimental tests, a 2000cc-class automotive vehicle engine was used to test the apparatus of the invention. It was observed that, when the engine was idling under no load, individual water beads as large as 1.5 mm to 2.5 mm in diameter were traveling through the transparent hose 10 successively at intervals of about 20 mm to 40 mm. When the engine was running under load, it was observed that those individual water beads were traveling with more speed and at smaller intervals.

EXAMPLE 1

(1) Thirteen (13) different three-way meeting point assemblies 5 were provided, each assembly including the two inlet branches open at each of the different angles α that range between 10 degrees and 120 degress. The apparatus according to the above described embodiment was tested by tentatively building each of those meeting point assemblies into that apparatus.

(2) For the testing purpose, a typical furnace blower burner (which was equipped with the oil injection governor) was chosen. Its specifications includes the fuel (A-class heavy oil) supply of 87 liters/h and the vapor output of 1,200 kg/h. An induction nozzle was provided beside the boiler, extending into the boiler. The induction nozzle and apparatus were connected by means of the interconnecting hose 10.

A diaphragm-type electric suction pump was interposed an the way of the interconnecting hose 10 between the boiler and apparatus. This pump delivers negative pressure output which provides the suction action for the apparatus, which delivers its highly humid air through the pump into the boiler.

(3) Measurements were taken with regard to the temperature of the flame core and the densities of CO, $CO_2$, and $O_2$ contained in the produced exhaust gases, while the apparatus were delivering its highly humid air into the boiler that was also running. During the testing period, the amount of water consumed by the apparatus was equal to 15 cc/min. The results are presented in Table 1 below.

TABLE 1

| Unit* | Angle (α)** | Flame Temp (°C.) | CO | $CO_2$ | $O_2$ |
|---|---|---|---|---|---|
| None | — | 610 | 0.028 | 7.90 | 7.1 |
| Comp 1 | 10 | 658 | 0.023 | 8.99 | 6.5 |
| 2 | 20 | 679 | 0.022 | 9.01 | 6.7 |
| 3 | 30 | 675 | 0.020 | 8.78 | 6.3 |
| 4 | 45 | 677 | 0.018 | 9.70 | 6.4 |
| 5 | 50 | 693 | 0.014 | 10.60 | 5.6 |
| Embo 1 | 55 | 725 | 0.005 | 12.03 | 4.1 |
| 2 | 60 | 805 | 0.000 | 14.70 | 2.6 |
| 3 | 65 | 733 | 0.000 | 13.10 | 3.3 |
| Comp 6 | 70 | 707 | 0.007 | 12.00 | 4.4 |

(densities in ppm)

TABLE 1-continued

| | (densities in ppm) | | | | |
|---|---|---|---|---|---|
| Unit* | Angle (α)** | Flame Temp (°C.) | CO | $CO_2$ | $O_2$ |
| 7 | 75 | 697 | 0.008 | 12.00 | 4.5 |
| 8 | 90 | 683 | 0.013 | 10.57 | 5.5 |
| 9 | 100 | 688 | 0.021 | 9.04 | 6.6 |
| 10 | 120 | 689 | 0.022 | 8.79 | 6.3 |

Note:
(1) Unit* means the apparatus being tested.
(2) Angle (α) means the angle between the two inlet branches at the three-way meeting point.
(3) Comp 1, etc. means the examples of the comparison.
(4) Embo 1, etc. means the embodiments.

(4) As it is clear from the data in Table 1, the angles α of between 55 degrees and 65 degrees provide the overall highest estimate points in terms of (1) the flame core temperature (the higher, the better), (2) the CO gas density (the lower, the better), (3) $CO_2$ gas density the (the higher, the better complete combustion), and (4) the $O_2$ gas density (the lower, the better complete combustion). The high $CO_2$ density means the better fuel economy.

It may be appreciated from the above figures that the highly humid air produced from the apparatus according to the present invention contributes greatly to the improved fuel economy and reduced exhaust gases.

EXAMPLE 2

(1) Eight (8) different first narrow pipes 1 and outlet nozzle assemblies 9e were provided for the testing purposes, respectively. Each first narrow pipe 1 includes a water inlet assembly 7 having a central passage of a different diameter $d_0$ from 0.1 to 1.0 mm, and each outlet nozzle assembly 9e has a central passage of a different diameter $d_2$ from 0.1 to 1.0 mm. The apparatus in the embodiment described above was tested for each combination ($d_0=d_2$) of the eight first narrow pipes 1 and associated outlet nozzle assemblies 9e.

(2) For the testing purposes, a Toyota Motors Co.'s 1989-model 2000 cc-gasoline engine car "Crown" (traveled the distance of 7,500 km before the day when the testing was carried out) was chosen.

The exhaust gas cleaner was removed from that car so that the exhaust gases from the engine could directly go through the muffler, and the exhaust gas sensor was mounted on the exhaust pipe.

Furthermore, the fuel usage meter (such as the one offered by Anzen Jidosha Co., Japan, as "Oil Petter") was mounted in the fuel system on the vehicle.

An 8 mm-diameter hole was provided on the particular way of the suction pipe from the engine, and a cylindrical nozzle with an internal diameter of 2.7 mm was mounted on the hole so that it extended into the suction pipe. The nozzle carries a plurality of 2 mm-diameter apertures on side wall thereof. This kind of nozzle is called the "flute nozzle". The interconnecting hose 10 was connected at its one end to the nozzle, and was connected at the other end to the apparatus of the invention.

(3) 1,200 cc of water was placed into the container 4 on the apparatus, and the vehicle being tested was placed on the Bosch's chassi dynamo. Then, the engine was running under load at varying speeds of 60 km/h, 80 km/h, and 100 km/h, at which speeds the four wheels were turning.

While the engine was running at each of those speeds, the measurements was taken for the usage of the water in the container 4 (percentage (%) by volume with regard to the fuel consumption), the quantity of fuel consumed (cc/min), and the densities of the produced exhaust gases (ppm). The results are shown in Tables 2 (a), (b) and (c) below.

TABLE 2(a)

| | (running under load at 60 km/h) | | | | |
|---|---|---|---|---|---|
| Unit* | $d_0$ $d_2$ | water Used (%) | Fuel Used | HC (ppm) | $NO_x$ (ppm) |
| None | — | — | 54.0 | 104 | 65 |
| No. 1 | 0.05 | 1.2 | 54.0 | 104 | 65 |
| 2 | 0.1 | 2.4 | 51.3 | 103 | 63 |
| 3 | 0.2 | 2.7 | 48.9 | 60 | 47 |
| 4 | 0.3 | 3.0 | 46.6 | 51 | 42 |
| 5 | 0.4 | 3.3 | 48.8 | 65 | 48 |
| 6 | 0.5 | 3.6 | 50.1 | 62 | 42 |
| 7 | 0.7 | 3.9 | 53.7 | 73 | 35 |
| 8 | 1.0 | 4.3 | 55.1 | 82 | 30 |

Note: Unit* means the apparatus being tested.

TABLE 2(b)

| | (running under load at 80 km/h) | | | | |
|---|---|---|---|---|---|
| Unit* | $d_0$ $d_2$ | water Used (%) | Fuel Used | HC (ppm) | $NO_x$ (ppm) |
| None | — | — | 101.0 | 153 | 93 |
| No. 1 | 0.05 | 1.2 | 98.5 | 153 | 93 |
| 2 | 0.1 | 2.4 | 91.0 | 146 | 91 |
| 3 | 0.2 | 2.7 | 80.3 | 77 | 81 |
| 4 | 0.3 | 3.0 | 80.0 | 74 | 69 |
| 5 | 0.4 | 3.3 | 86.2 | 65 | 66 |
| 6 | 0.5 | 3.6 | 91.6 | 85 | 66 |
| 7 | 0.7 | 3.9 | 96.6 | 97 | 50 |
| 8 | 1.0 | 4.3 | 104.4 | 124 | 44 |

Note: Unit* means the apparatus being tested.

TABLE 2(c)

| | (running under load at 100 km/h) | | | | |
|---|---|---|---|---|---|
| Unit* | $d_0$ $d_2$ | water Used (%) | Fuel Used | HC (ppm) | $NO_x$ (ppm) |
| None | — | — | 121.7 | 184 | 136 |
| No. 1 | 0.05 | 1.2 | 121.0 | 184 | 136 |
| 2 | 0.1 | 2.4 | 103.7 | 161 | 136 |
| 3 | 0.2 | 2.7 | 99.0 | 83 | 98 |
| 4 | 0.3 | 3.0 | 98.3 | 80 | 96 |
| 5 | 0.4 | 3.3 | 99.2 | 83 | 94 |
| 6 | 0.5 | 3.6 | 111.0 | 100 | 95 |
| 7 | 0.7 | 3.9 | 116.5 | 108 | 88 |
| 8 | 1.0 | 4.3 | 119.7 | 126 | 84 |

Note: Unit* means the apparatus being tested.

As it may be appreciated from the results in the above tables, with particular reference to the fuel consumption, the combination of the water inlet 7 and outlet nozzle 9e having the internal passage diameters $d_0=d_2$ ranging between 0.1 mm and 0.5 mm will provide the better fuel economy (less fuel consumption) at all of the running speeds. For the densities of the produced exhaust gases, the combination of $d_0=d_2$ ranging between 0.1 mm and 0.5 mm will provide less HC, just as for the fuel consumption, and the greater $d_0=d_2$ values will provide the less $NO_x$.

EXAMPLE 3

For this particular testing, the apparatus was set up to provide $d_0=d_2$ that was equal to 0.3 mm, and was used in conjunction with the vehicle in Example 2, with the third narrow pipe disposed at varying angles β with regard to its vertical position. Then, the vehicle engine was running at 60 km/h and 80 km/h under the same load condition as in Example 2. The measurements included the usage of water (percentage (%) by volume with regard to the fuel consumption), and the quantity of fuel consumed (cc/min). Those measurements were repeated by varying the value of the angle $\beta$.

The results are shown in Table 3 below. As seen from Table 3, the usage of water is the same when the engine is running at 60 km/h and at 80 km/h, so the data obtained for both cases is presented in the same table.

TABLE 3

| Unit* | Angle $\beta$ | Water Usage (%) | Fuel Consumption (cc/min) 60 km/h | 80 km/h |
|---|---|---|---|---|
| No. 1 | — | — | 54.02 | 101.00 |
| 2 | 0 | 3.0 | 43.60 | 80.07 |
| 3 | 5 | 3.0 | 43.55 | 80.21 |
| 4 | 10 | 3.0 | 43.84 | 80.34 |
| 5 | 15 | 3.0 | 43.05 | 81.65 |
| 6 | 20 | 3.0 | 44.23 | 81.85 |
| 7 | 25 | 3.2 | 49.88 | 96.34 |
| 8 | 45 | 18.1 | 54.52 | 107.01 |
| 9 | 90 | 21.3 | 54.82 | 107.40 |

Note: Unit* means the apparatus being tested, except for No. 1 where no apparatus was used.

As clearly seen from the results in Table 3, the third narrow pipe 3 in its vertical position ($\beta=0$) provides the optimum fuel economy (less fuel consumption). When it is inclined at angles of more than 20 degrees with regard to the vertical position, it causes a rapid increase in the fuel consumption, resulting in worse fuel economy. This means that the vertical pipe 3 provides the best fuel economy, and yet better fuel economy may be provided within angles of between +20 and −20 degrees with regard to the vertical position of the pipe 3.

EXAMPLE 4

(1) The apparatus was set up to provide the combination of $d_0=d_2$ equal to 0.3 mm, and was connected to the exhaust gas sampling unit (such as the one offered by Simazu Seisakusho, Japan, as "CFP-301") by means the interconnecting hose 10.

Then, the diaphragm-type electric suction pump was connected, which provides the suction pump for the above sampling unit. The apparatus produced its highly humid air under the negative pressure of 550 mmHg as supplied by the suction pump.

The exhaust gas sampling unit contains a drawn gas induction pipe that includes a cooler core on its way, where the highly humid air is cooled to −10° C., at which the vaporized water in the air turns to liquid. The suction pump draws the mixture of air and liquid water into a drain box therein.

The mixture is separated into the liquid water which gathers on the bottom of the drain box, and the air that stays above the water therein. Previously, the suction pump was set up to stop automatically when the air pressure would reach up to 1.3 bars (including the atmospheric pressure).

At this pressure setting of 1.3 bars, the sampling unit was previously set up to provide the identical negative pressure (which is equal to about 550 mmHg) on the simulation test, as if the vehicle in Example 2 were running under load at 80 km/h. The apparatus was placed under that negative pressure.

During the period in which this particular testing occurred, the ambient temperature was about 15° C., and the temperature of the air in the drain box was about 7° C.

The drain box is graduated to permit the visual reading of the water level from the outside. Then, attempts were made to measure any changes in the water level (cc) and the quantity of air (at 7° C., under 1.3 bars). In this specification, those changes will conveniently be referred to as "water-to-air ratio".

(2) Following the simulation test, the apparatus used in (1) above ($d_0=d_2$ equal to 0.3 mm) was used in conjunction with the actual vehicle in Example 2.

The vehicle was running under load (under the negative pressure of about 550 mmHg) at 80 km/h, and the fuel consumption (cc/min) was measured.

During that testing, the same negative pressure as that developed in the suction pump was developed in the engine room on the vehicle was delivered into the apparatus, which provided the highly humid air under the same conditions as in (1) above.

(3) Then, by changing the air control filter 8b to several different types, the measurements in (1) and (2) were repeated, respectively. The results are shown in Table 4 below.

TABLE 4

| Unit* | Water/Air Ratio (Note 1) | Fuel Consumed (cc/min) |
|---|---|---|
| No. 1 | — | 101.0 |
| 2 | 1/15 | 99.0 |
| 3 | 1/16 | 94.7 |
| 4 | 1/17 | 90.5 |
| 5 | 1/18 | 84.3 |
| 6 | 1/19 | 79.9 |
| 7 | 1/20 | 86.2 |
| 8 | 1/21 | 91.7 |
| 9 | 1/22 | 99.9 |
| 10 | 1/23 | 107.4 |

Note 1: Air is represented by volume at 7° C., 1.3 bars.
No. 1 in the "Unit*" column means that the apparatus is not used.

It may be appreciated from the results in Table 4 that the water-to-air ratio of between 1/17 and 1/21 provides the optimum highly humid air production, which contributes to the best fuel economy (the least fuel consumption). The use of the air control filter 8b under those optimum water-to-air ratio requirements may help improve the fuel economy.

EXAMPLE 5

The apparatus was set up to provide the combination of $d_0=d_2$ equal to 0.3 mm, and was used in conjunction with a diesel engine (such as the one offered by Komatu Seisakusho, Japan, as the model "S6D 125 220KVA/60 HZ"). Then, the co-generation system was used to test the apparatus for its performance. The power generator used was the one as offered by Denyo Co., Japan, as the model "DCA-220SPM (K)."

The densities of the exhaust gases produced from the diesel engine was measured when it was running with the apparatus (referred to as "Experiment Running") and when it was running without the apparatus (referred to as "Normal Running"). The results are shown in Table 5 below and attached FIGS. 6 and 7. Those results were obtained on Oct. 5, 1990.

Figure 6:
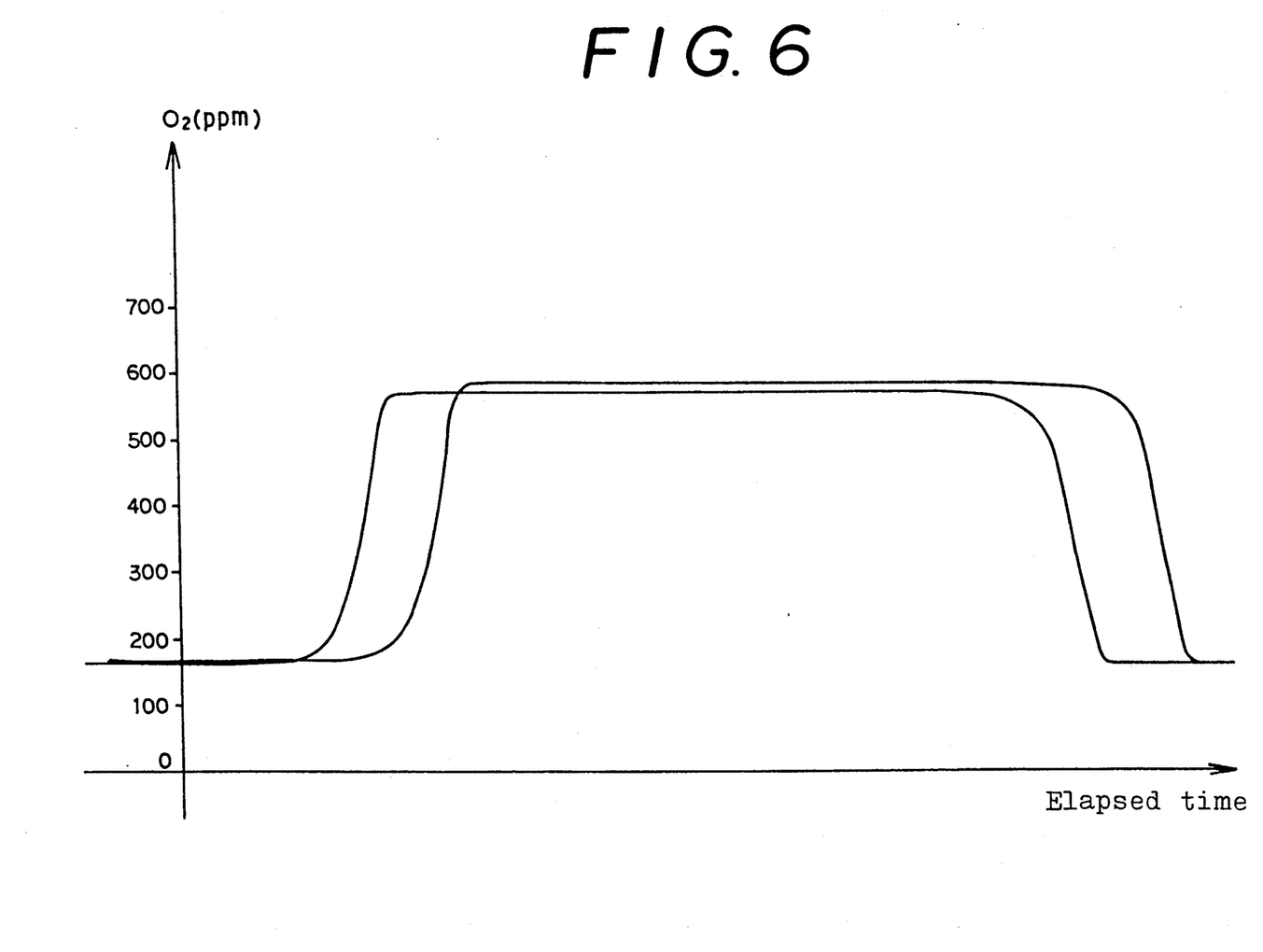
FIG. 6 is a graph showing $O_2$ density in the exhaust gases.
Figure 7:
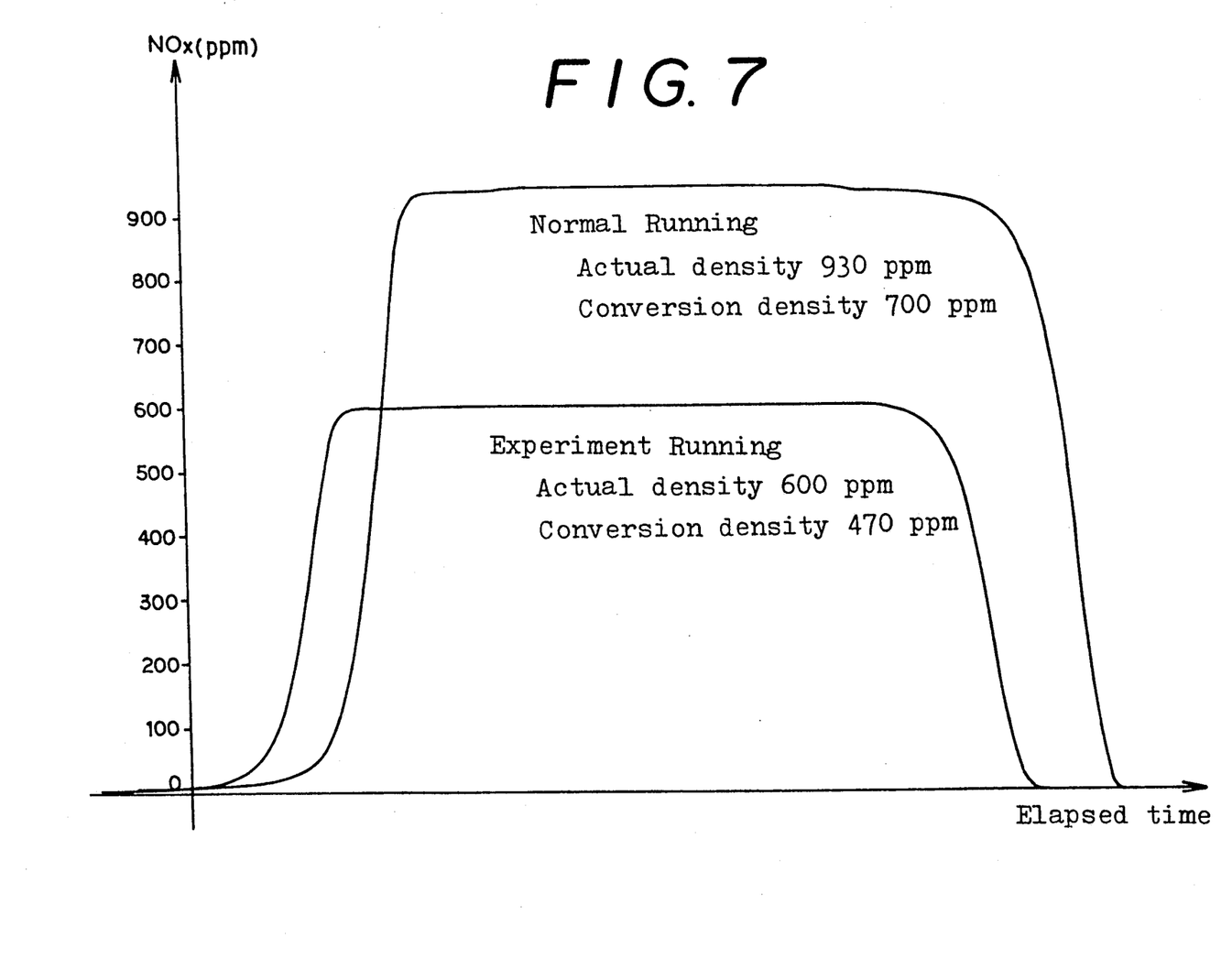
FIG. 7 is a graph showing $NO_x$ density in the exhaust gases measured in the same experiment shown by FIG. 6.

FIGS. 6 and 7 show a graphs which are obtained by this experiment 5 demonstrating the superior performance of the present apparatus. FIG. 6 shows $O_2$ density in the exhaust gases and FIG. 7 shows $NO_x$ density in the exhaust gases. $O_2$ density and $NO_x$ density increase as the running begins, then they remain almost constant density during stationary running state and decrease as the running stops. In FIG. 6, $O_2$ density in Experiment Running is larger than that of in Normal Running as shown by Table 5. In FIG. 7, convention density of $NO_x$ is to calculate actual $NO_x$ density in the condition as which $O_2$ is contained 13% by volume in the exhaust gases.

TABLE 5

|  | Normal Running | Experiment Running |
|---|---|---|
| Load | 360A | 360A |
| Gas Temp | 383° C. | 401° C. |
| $CO_2$ | 6.4% | 6.1% |
| CO | 0.155% | 0.108% |
| $C_2$ | 10.4% | 10.8% |
| $NO_x$ | 930 ppm | 600 ppm |

Water Temperature: 85° C.; Ambient Temperature: 27° C., Relative Humidity: 77%

Note that $CO_2$, CO, and $O_2$ were measured in terms of the respective content proportions (%) contained in the exhaust gases, and $NO_x$ was measured in terms of its density (ppm) in the exhaust gases.

The results show that the contents (%) of $CO_2$, CO, and $NO_x$ in the exhaust gases were reduced, and the content of $NO_x$ in particular was controlled effectively, when the apparatus was used.

The present invention has been described so far with reference to some particular preferred embodiments thereof, but it should be understood that various changes and modifications may be made without departing from the spirit and scope of the invention.

What is claimed is:

1. An apparatus for producing a highly humid air, which includes:

a container for holding water;

first narrow-passage pipe means having a water inlet located in the water in the container and for drawing the water by suction under reduced pressure through the water inlet and producing vaporized water;

second narrow-passage pipe means having an air inlet leading to the atmosphere;

a three-way meeting means having first and second inlet branches and one outlet branch extending therefrom in the form of the reversed Y shape where the vaporized water flow from the first narrow-passage pipe means and the air flow from the second narrow-passage pipe means meet together, forming into a single flow containing the mixture of the vaporized water and air flows which is rising through the outlet branch; and third narrow-passage pipe means disposed substantially vertically and connected to the outlet branch from the three-way meeting means, the third narrow-passage means having an outlet nozzle through which the single flow is forced out, wherein:

said first inlet branch connected to the said first narrow-passage pipe means and said second inlet branch connected to said second narrow-passage pipe means meet together at any of the angles $\alpha$ of between 55 degrees and 65 degrees.

2. An apparatus as defined in claim 1, wherein the passages through said three branches in said three-way meeting means have the common diameter range between 1 mm and 3 mm.

3. An apparatus as defined in claim 1, wherein said first narrow-passage pipe means, said second narrow-passage pipe means, and said third narrow-passage pipe means have the common diameter range between 1 mm and 5 mm.

4. An apparatus as defined in claim 1, wherein said third narrow-passage pipe means has the length range between 80 mm and 180 mm.

5. An apparatus as defined in claim 1, wherein said third narrow-passage pipe means is disposed vertically or is inclined at the angle range between +20 degrees and −20 degrees with regard to its vertical position.

6. An apparatus as defined in claim 1, wherein said three-way meeting means is made of any suitable high-polymer polyethylene materials.

7. An apparatus as defined in claim 1, wherein the diameter $d_0$ of the narrow passage through said water inlet and the diameter $d_2$ of the narrow passage through said outlet nozzle are equal ($d_0=d_2$), said $d_0=d_2$ having the value range between 0.1 mm and 0.5 mm.

8. An apparatus as defined in claim 1, wherein the diameter $d_0$ of the narrow passage through said water inlet and the diameter $d_2$ of the narrow passage through said outlet nozzle are equal ($d_0=d_2$), said $d_0=d_2$ having the value range between 0.5 mm and 1.5 mm.

9. An apparatus as defined in claim 1, wherein said air inlet draws the air from the atmosphere at such rates that the mixture of water and air flows formed at said three-way meeting means when those two flows enter it can have the water-to-air ratio value range between 1/17 and 1/21.

* * * * *